(12) United States Patent
Henderson et al.

(10) Patent No.: US 12,654,549 B2
(45) Date of Patent: Jun. 16, 2026

(54) INVERSE TYRE MODEL BOOST FUNCTION FOR A HEAVY-DUTY VEHICLE

(71) Applicant: VOLVO TRUCK CORPORATION, Gothenburg (SE)

(72) Inventors: Leon Henderson, Härryda (SE); Ramadan Salif, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 99 days.

(21) Appl. No.: 18/702,210

(22) PCT Filed: Jan. 31, 2022

(86) PCT No.: PCT/EP2022/052223
§ 371 (c)(1),
(2) Date: Apr. 17, 2024

(87) PCT Pub. No.: WO2023/066527
PCT Pub. Date: Apr. 27, 2023

(65) Prior Publication Data
US 2025/0242812 A1 Jul. 31, 2025

(30) Foreign Application Priority Data
Oct. 18, 2021 (EP) .................................... 21203148

(51) Int. Cl.
*B60T 8/17* (2006.01)
*B60K 28/16* (2006.01)
(Continued)

(52) U.S. Cl.
CPC ............ *B60K 28/16* (2013.01); *B60T 8/1708* (2013.01); *B60T 8/172* (2013.01); *B60T 8/175* (2013.01);
(Continued)

(58) Field of Classification Search
None
See application file for complete search history.

(56) References Cited

U.S. PATENT DOCUMENTS

| | | | | |
|---|---|---|---|---|
| 12,030,477 B2 * | 7/2024 | Subramanian | ........ | B60T 8/1708 |
| 12,208,799 B2 * | 1/2025 | Salif | ...................... | B60K 28/16 |

(Continued)

FOREIGN PATENT DOCUMENTS

| | | | | | |
|---|---|---|---|---|---|
| CN | 107291085 A | * | 10/2017 | ........... | G05D 1/0223 |
| DE | 102008032763 A1 | * | 2/2009 | .......... | B60T 8/17555 |

(Continued)

OTHER PUBLICATIONS

International Search Report and Written Opinion of the International Searching Authority in corresponding International Application No. PCT/EP2022/052223 mailed Jul. 22, 2022 (9 pages).

(Continued)

*Primary Examiner* — Kevin R Steckbauer
(74) *Attorney, Agent, or Firm* — Jeffri A. Kaminski; Venable LLP

(57) ABSTRACT

A computer implemented method for controlling at least one driven and/or braked wheel of a heavy-duty vehicle includes configuring a default inverse tire model and a boost inverse tire model, where each inverse tire model represents a respective relationship between longitudinal wheel slip and longitudinal wheel force at the wheel, where the boost inverse tire model is associated with a higher maximum obtainable wheel slip value for the wheel compared to the default inverse tire model, obtaining a motion request indicative of a desired longitudinal force to be generated by the wheel, selecting the boost inverse tire model as active inverse tire model in response to detecting a boost signal and selecting the default inverse tire model as active inverse tire model otherwise, and controlling the at least one driven
(Continued)

and/or braked wheel in dependence of the motion request and based on the active inverse tire model.

14 Claims, 5 Drawing Sheets

(51) Int. Cl.

| | | |
|---|---|---|
| *B60T 8/172* | (2006.01) | |
| *B60T 8/175* | (2006.01) | |
| *B60T 8/1755* | (2006.01) | |
| *B60T 8/1761* | (2006.01) | |
| *B60W 10/04* | (2006.01) | |
| *B60W 10/18* | (2012.01) | |
| *B60W 30/18* | (2012.01) | |
| *B60W 50/00* | (2006.01) | |

(52) U.S. Cl.

CPC ...... *B60T 8/17552* (2013.01); *B60T 8/17616* (2013.01); *B60W 10/04* (2013.01); *B60W 10/18* (2013.01); *B60W 30/18172* (2013.01); *B60T 2220/04* (2013.01); *B60T 2230/02* (2013.01); *B60T 2240/06* (2013.01); *B60W 2050/0031* (2013.01); *B60W 2050/0037* (2013.01); *B60W 2300/125* (2013.01); *B60W 2520/26* (2013.01); *B60W 2540/103* (2013.01); *B60W 2540/12* (2013.01)

(56) References Cited

U.S. PATENT DOCUMENTS

| | | | | |
|---|---|---|---|---|
| 12,337,696 | B2 * | 6/2025 | Arikere | B60T 8/172 |
| 12,358,509 | B2 * | 7/2025 | Gao | B60T 8/17552 |
| 12,391,260 | B2 * | 8/2025 | Subramanian | B60T 8/171 |
| 2009/0107748 | A1 | 4/2009 | Luehrsen et al. | |
| 2016/0368503 | A1 * | 12/2016 | Jonasson | B60R 16/023 |
| 2021/0078582 | A1 | 3/2021 | Murase | |
| 2022/0126799 | A1 * | 4/2022 | Arikere | B60T 8/171 |
| 2023/0047444 | A1 * | 2/2023 | Henderson | B60W 30/18172 |
| 2023/0063613 | A1 * | 3/2023 | Gao | B60W 30/18172 |
| 2023/0120062 | A1 * | 4/2023 | Henderson | B60T 8/175 701/71 |
| 2023/0174029 | A1 * | 6/2023 | Subramanian | B60T 8/1725 |
| 2023/0174079 | A1 * | 6/2023 | Subramanian | B60T 8/92 |
| 2024/0025267 | A1 * | 1/2024 | Arikere | B60T 8/17616 |
| 2024/0182019 | A1 * | 6/2024 | Gao | B60W 30/18145 |
| 2024/0286615 | A1 * | 8/2024 | Salif | B60W 10/04 |
| 2024/0359706 | A1 * | 10/2024 | Tagesson | B60W 10/18 |
| 2024/0383339 | A1 * | 11/2024 | Laine | B60L 3/102 |
| 2025/0026325 | A1 * | 1/2025 | Rydström | B60W 40/12 |
| 2025/0050851 | A1 * | 2/2025 | Salif | B60T 8/1761 |
| 2025/0242812 | A1 * | 7/2025 | Henderson | B60T 8/175 |
| 2025/0289320 | A1 * | 9/2025 | Arikere | B60T 8/1708 |

FOREIGN PATENT DOCUMENTS

| | | | | |
|---|---|---|---|---|
| EP | 0755821 | A2 | 1/1997 | |
| EP | 3398825 | A1 | 11/2018 | |
| EP | 3851346 | A1 * | 7/2021 | B60W 40/107 |
| EP | 4140839 | A1 * | 3/2023 | B60W 50/14 |
| EP | 4166368 | A1 * | 4/2023 | B60W 30/18172 |
| EP | 4190598 | A1 * | 6/2023 | B60W 50/029 |
| EP | 4190651 | A1 * | 6/2023 | B60T 8/1761 |
| EP | 3851346 | B1 * | 11/2023 | B60W 30/18172 |
| EP | 4166368 | B1 * | 3/2024 | B60W 30/18172 |
| EP | 4140839 | B1 * | 10/2024 | B60W 50/14 |
| EP | 4190598 | B1 * | 11/2024 | B60W 10/18 |
| EP | 4244105 | B1 * | 11/2024 | B60T 8/172 |
| EP | 4190651 | B1 * | 5/2025 | B60T 8/1761 |
| EP | 4330097 | B1 * | 5/2025 | B60W 30/18145 |
| EP | 4347302 | B1 * | 7/2025 | B60L 3/102 |
| EP | 4419366 | B1 * | 7/2025 | B60W 30/18172 |
| JP | 2023035900 | A * | 3/2023 | B60W 50/14 |
| JP | 2023552963 | A * | 12/2023 | B60W 30/18172 |
| JP | 2024522517 | A * | 6/2024 | B60L 3/102 |
| JP | 7508563 | B2 * | 7/2024 | B60W 30/18172 |
| JP | 2024531489 | A * | 8/2024 | B60W 40/00 |
| JP | 2024541857 | A * | 11/2024 | B60W 30/18172 |
| KR | 20220125810 | A * | 9/2022 | B60W 30/02 |
| KR | 20230033589 | A * | 3/2023 | B60W 50/14 |
| KR | 20230035388 | A * | 3/2023 | B60T 8/1755 |
| KR | 20240016280 | A * | 2/2024 | B60L 3/102 |
| KR | 20240054985 | A * | 4/2024 | B60W 40/00 |
| KR | 20240093520 | A * | 6/2024 | B60W 30/18172 |
| WO | 2013186208 | A2 | 12/2013 | |
| WO | 2017215751 | A1 | 12/2017 | |
| WO | 21144065 | A1 | 7/2021 | |
| WO | 2021144010 | A1 | 7/2021 | |
| WO | WO-2021144065 | A1 * | 7/2021 | B60W 10/04 |
| WO | WO-2022100907 | A1 * | 5/2022 | B60W 50/00 |
| WO | WO-2022228653 | A1 * | 11/2022 | B60W 30/045 |
| WO | WO-2022253411 | A1 * | 12/2022 | B60L 15/20 |
| WO | WO-2023030615 | A1 * | 3/2023 | B60W 40/00 |
| WO | WO-2023066527 | A1 * | 4/2023 | B60W 30/18172 |
| WO | WO-2023098991 | A1 * | 6/2023 | B60T 8/1725 |
| WO | WO-2024251347 | A1 * | 12/2024 | G01P 3/38 |

OTHER PUBLICATIONS

Extended European Search Report in corresponding European Application No. 21203148.8 dated Apr. 20, 2022 (5 pages).

Hans Pacejka; "Tyre and vehicle dynamics"; Elsevier Ltd. 2012, ISBN 978-0-08-097016-5 (621 pages).

Japanese Notice of Reasons for Refusal in Japanese application No. 2024522678 dated Nov. 6, 2025 (14 pages).

* cited by examiner

INVERSE TYRE MODEL BOOST FUNCTION FOR A HEAVY-DUTY VEHICLE

CROSS-REFERENCE TO RELATED APPLICATIONS

This application is a U.S. National Stage application of PCT/EP2022/052223, filed Jan. 31, 2022 and published on Apr. 27, 2023, as WO 2023/066527, which claims the benefit of European Patent Application No. 21203148.8, filed Oct. 18, 2021, all of which are hereby incorporated by reference in their entireties.

TECHNICAL FIELD

The present disclosure relates to methods and control units for ensuring safe and efficient vehicle motion management of a heavy-duty vehicle. The methods are particularly suitable for use with cargo transporting vehicles, such as trucks and semi-trailers. The invention can however also be applied in other types of heavy-duty vehicles, e.g., in construction equipment and in mining vehicles, as well as in cars.

BACKGROUND

Heavy-duty vehicles have traditionally been controlled using torque request signals determined based on the position of an accelerator or brake pedal and sent to motion support devices (MSDs) such as service brakes and propulsion devices over digital interfaces. However, advantages may be obtained by instead controlling the actuators using wheel slip or wheel speed requests sent from a central vehicle controller to the different actuators. This moves the actuator control closer to the wheel end, and therefore allows for a reduced latency and a faster more accurate control of the MSDs. Wheel-slip based MSD control approaches are particularly suitable for use with wheel-end electrical machines in a battery or fuel cell powered vehicle, which axle speeds can be accurately controlled at high bandwidth. Wheel-slip based vehicle motion management and its associated advantages are discussed, e.g., in WO 2017/215751 and in WO 2021/144010.

Wheel slip or wheel speed-based control of heavy-duty vehicles often relies on an approximated relationship between wheel slip and generated longitudinal wheel force, often referred to as an inverse tyre model. However, a heavy-duty vehicle is a complex dynamic mechanical system that is difficult to model accurately and that may quickly change behavior in response to e.g., a change in road friction conditions or a change in wheel normal force. Thus, the inverse tyre model may not always be totally accurate, which can lead to reduced performance in wheel slip based or wheel speed based heavy-duty vehicle control systems.

There is a desire for vehicle motion management methods which are more resilient to errors in the approximated relationship between wheel slip and generated longitudinal wheel force.

SUMMARY

It is an object of the present disclosure to at least partially overcome the above-described deficiencies, and to provide improved methods for controlling a heavy-duty vehicle. The object is obtained by a computer implemented method for controlling at least one driven and/or braked wheel of a heavy-duty vehicle. The method comprises configuring a default inverse tyre model and at least one boost inverse tyre model, where each inverse tyre model represents a respective relationship between longitudinal wheel slip and longitudinal wheel force at the wheel, where the boost inverse tyre model is associated with a higher maximum obtainable wheel slip value for the wheel compared to the default inverse tyre model. The method also comprises obtaining a motion request indicative of a desired longitudinal force to be generated by the wheel, selecting the boost inverse tyre model as active inverse tyre model in response to detecting a boost signal and selecting the default inverse tyre model as active inverse tyre model otherwise, and controlling the at least one driven and/or braked wheel in dependence of the motion request and based on the active inverse tyre model.

This way the allowable maximum wheel slip, e.g., as determined by a wheel slip limit associated with the active inverse tyre model, can be temporarily increased by generation of the boost signal. The feature may come in handy, e.g., when driving uphill in difficult conditions or in other scenarios where a driver, a remote controller, or an autonomous drive algorithm determines that a wheel slip beyond the default wheel slip limit value is desired, giving an extra boost. By means of the disclosed method, a vehicle motion management method which is more resilient to errors in the approximated relationship between wheel slip and generated longitudinal wheel force is provided. The proposed method may selectively activate a boost inverse tyre model for a single wheel, for the wheels of an axle, or for more than two wheels on the vehicle, in dependence of the driving scenario and the desired effect on the overall motion of the vehicle.

The default inverse tyre model and the boost inverse tyre model may be configured in a number of different ways, and more than one boost inverse tyre model can also be configured and selected from, e.g., by using a boost signal with more than one level where each boost signal level corresponds to activation of a respective boost inverse tyre model from a set of boost inverse tyre models.

According to some aspects, the method comprises configuring the boost inverse tyre model with a peak longitudinal wheel force that corresponds to a higher wheel slip value compared to the default inverse tyre model peak longitudinal wheel force, such that a request for maximum force results in a higher wheel slip when using the boost inverse tyre model compared to when using the default inverse tyre model. According to other aspects the boost inverse tyre model is configured with a smaller slip stiffness value compared to the default inverse tyre model, which also results in that a given wheel force maps to a higher wheel slip for the boost inverse tyre model compared to the default inverse tyre model. According to further aspects, the boost inverse tyre model just has a higher wheel slip limit compared to the default inverse tyre model, i.e., the two models are essentially the same, but the wheel slip limit is configured differently to allow for a higher wheel slip to be generated by the wheel compared to when using the default inverse tyre model. For instance, the wheel slip limit may be configured at a first distance from the peak force location in the default inverse tyre model and at a second distance to the peak force location for the boost inverse tyre model.

The motion request may, e.g., be obtained as function of an accelerator pedal position or a brake pedal position, thus allowing a driver to engage the boost mode in a convenient manner by depressing the pedal by a significant amount, e.g., in excess of some predetermined threshold value, perhaps also for some pre.-determined duration of time. It is appreciated that the method may be most useful in connection to acceleration, i.e., forward propulsion, although it may also find important uses in connection to retardation, i.e., during hard braking.

Alternatively, or as a complement to pedal position triggering of the boost mode, the motion request may be obtained from an MSD coordination function of a VMM system comprised in the heavy-duty vehicle as will be discussed in more detail below, and/or from an autonomous or semi-autonomous drive function comprised in the vehicle. This means that the vehicle control functions will have the option of temporarily increasing wheel slip in order to obtain a boost, at least temporarily, e.g., in case it is believed that a too conservative slip limit is in place. This increases the control freedom of an autonomous or semi-autonomous control algorithm, which is an advantage.

The boost signal may, e.g., be triggered when an accelerator pedal position or brake pedal position exceeds a threshold value. The boost signal may also be manually triggered by operation of a trigger device, such as an in-cabin button, switch, or the like. This type of trigger device may of course be configured with more than one level as discussed above, and thus used to select a boost inverse tyre model from a set of more than one inverse tyre model to be the active inverse tyre model. The boost signal may also be triggered by an accelerator pedal position or brake pedal position exceeding a threshold value for a pre-determined time period.

In order to not jeopardize vehicle stability, the boost signal is optionally conditioned on that the vehicle is operating at a velocity below a vehicle velocity acceptance threshold. Thus, no boost signal will be generated (and no boost inverse tyre model selected as the active inverse tyre model) if the vehicle is moving too fast, even if the driver depresses a pedal all the way or presses the manual boost signal generation in-cabin button. Generation of the boost signal may also be conditioned on that the vehicle is operating at a yaw motion below a vehicle yaw motion acceptance threshold, such that no boost inverse tyre model will be selected if the yaw motion is too high. This means that the method can be configured such that no boost mode is allowed if the vehicle is cornering, since this could jeopardize successful completion of the turning maneuver. The reason being that the ability to generate lateral force is reduced when longitudinal wheel slip increases, which may happen when the boost inverse tyre model is the active inverse tyre model. In a similar manner, the method may of course also comprise determining a lateral force requirement of the at least driven and/or braked wheel, wherein the boost signal can be conditioned on that the lateral force requirement is below a lateral force requirement threshold. This way vehicle stability and safety are not jeopardized by the potential increase in wheel slip allowed when the boost inverse tyre model is the active inverse tyre model.

The method may also comprise selecting the boost inverse tyre model to be the active inverse tyre model only during a pre-determined time period. After this time period, the inverse tyre model settings may, e.g., revert back to the default setting or to some other interim value, i.e., a gradual return the default inverse tyre model. This may prevent the wheels of the vehicle from, e.g., digging into the road surface, which of course is an advantage.

According to aspects, the boost signal is arranged to be remotely triggered by operation of a remote-control trigger device. This allows an operator or autonomous function external to the vehicle to trigger the boost mode, e.g., to allow the vehicle to negotiate a difficult hill or the like. This way additional functionality may be granted to the vehicle by a remote authority, which could be an advantage in some situations, e.g., in confined areas where autonomous vehicles are otherwise required to operate at rather conservative wheel slip values in order to ensure safe operation. The remote authority may temporarily allow the autonomous of semi-autonomous vehicle to operate at a higher wheel slip value, in order to temporarily increase the maneuverability of the vehicle and perhaps break free of a situation where the vehicle is stuck or needs improved startability capability.

The method may also comprise updating the default inverse tyre model associated with the at least one driven and/or braked wheel in response to detecting the boost signal. This means that the inverse tyre model used for managing vehicle motion during normal operating conditions will be refined over time, leading to a more accurate inverse tyre model, which is an advantage. When updating an inverse tyre model in this manner, it may be advantageous to see what happens if the wheel slip is allowed to increase temporarily past a configured wheel slip limit, which will be allowed when the boost inverse tyre model is selected as the active inverse tyre model.

There is also disclosed herein control units, vehicle units, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
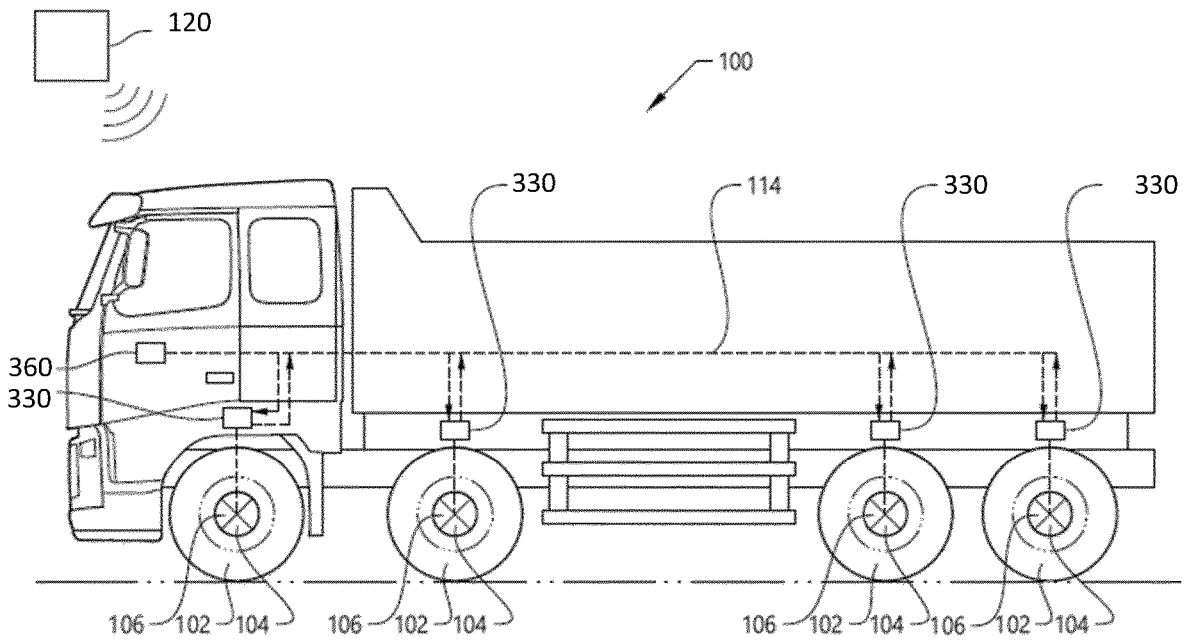
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates an example heavy-duty vehicle 100, here in the form of a truck. The vehicle comprises a plurality of wheels 102, wherein at least a subset of the wheels 102 comprises a respective motion support device (MSD) 104. Although the embodiment depicted in FIG. 1 illustrates an MSD for each of the wheels 102, it should be readily understood that e.g., one pair of wheels 102 may be arranged without such an MSD 104. Also, an MSD may be arranged connected to more than one wheel, e.g., via a differential arrangement.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The MSDs 104 may be arranged for generating a torque on a respective wheel of the vehicle or for both wheels of an axle. The MSD may be a propulsion device, such as an electric machine 106 arranged to e.g., provide a longitudinal wheel force to the wheel(s) of the vehicle 100. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

The MSDs 104 may also comprise friction brakes such as disc brakes or drum brakes arranged to generate a braking torque by the wheel 102 in order to decelerate the vehicle. Herein, the term acceleration is to be construed broadly to encompass both positive acceleration (propulsion) and negative acceleration (braking).

The methods disclosed herein primarily relate to controlling propulsion of heavy-duty vehicles, i.e., acceleration. However, the disclosed methods may also find use in decelerating heavy-duty vehicles, i.e., during braking maneuvers.

Moreover, each of the MSDs 104 is connected to a respective MSD control system or control unit 330 arranged for controlling operation of the MSD 104. The MSD control system 330 is preferably a decentralized motion support system 330, although centralized implementations are also possible. It is furthermore appreciated that some parts of the MSD control system may be implemented on processing circuitry remote from the vehicle, such as on a remote server 120 accessible from the vehicle via wireless link. Still further, each MSD control system 330 is connected to a vehicle motion management (VMM) system or function 360 of the vehicle 100 via a data bus communication arrangement 114 that can be either wired, wireless or both wired and wireless. Hereby, control signals can be transmitted between the vehicle motion management system 360 and the MSD control system 330. The vehicle motion management system 360 and the MSD control system 330 will be described in further detail below with reference to FIG. 3 and FIG. 5.

The VMM system 360 as well as the MSD control system 330 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 10.

Generally, the MSDs on the vehicle 100 may also be realized as, e.g., a power steering device, active suspension devices, and the like. Although these types of MSDs cannot be used to directly generate longitudinal force to accelerate or brake the vehicle, they are still part of the overall vehicle motion management of the heavy-duty vehicle and may therefore form part of the herein disclosed methods for vehicle motion management. Notably, the MSDs of the heavy-duty vehicle 100 are often coordinated in order to obtain a desired motion by the vehicle. For instance, two or more MSDs may be used jointly to generate a desired propulsion torque or braking torque, a desired yaw motion by the vehicle, or some other dynamic behavior.

Figure 2:
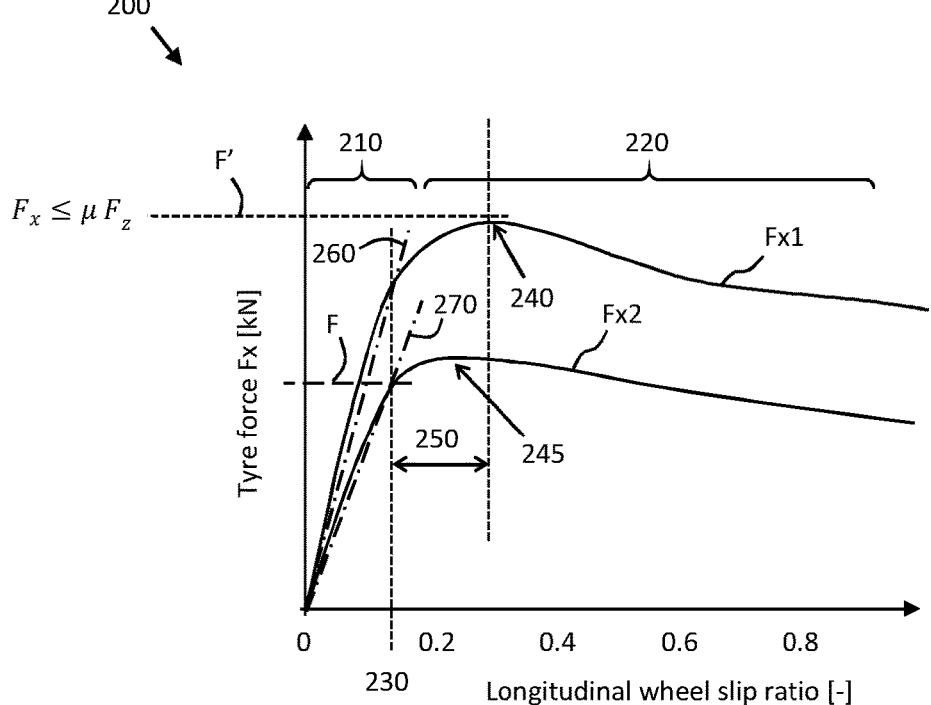
FIG. 2 is a graph showing example tyre forces as function of wheel slip.
Figure 7:
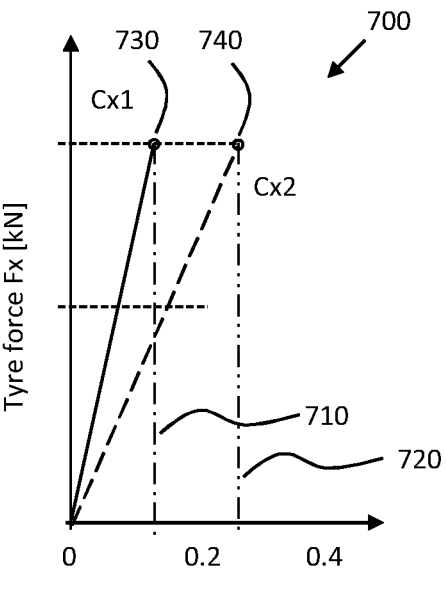
Figure 8:
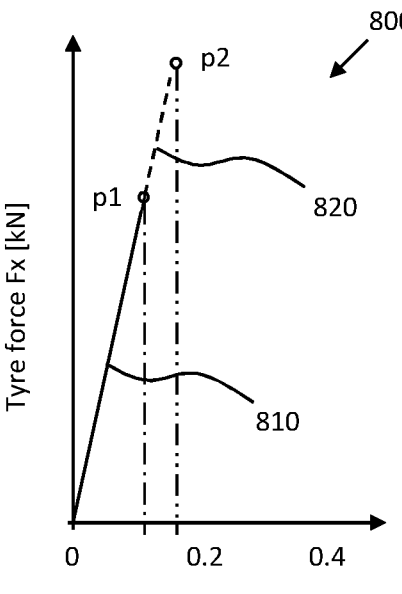

FIG. 2 is a graph showing two examples 200 of achievable tyre forces as function of longitudinal wheel slip. This type of relationship between wheel slip and generated tyre force is referred to herein as an inverse tyre model. The inverse tyre model can be a function as illustrated in FIG. 2, or just a piecewise linear approximation over a part of the wheel slip range, as shown in FIGS. 7 and 8 which will be discussed in more detail below. The examples in FIG. 2 are for positive wheel forces, i.e., acceleration. Similar relationships exist between wheel slip and negative wheel force, i.e., braking.

Longitudinal wheel slip $\lambda_x$ may, in accordance with SAE J370 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM 360 and optionally also the MSD control system 330 optionally maintains information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force is approximately linear, where the proportionality constant is often denoted as the slip stiffness $C_x$ 260, 270 of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given wheel slip can be described by the so-called Magic Formula as described in "Tyre and vehicle dynamics", Elsevier Ltd. 2012, ISBN 978-0-08-097016-5, by Hans Pacejka, where wheel slip and tyre force is also discussed in detail.

An inverse tyre model can be used to translate between a desired longitudinal tyre force $F_x$ and wheel slip $\lambda$. The interface between VMM and MSDs capable of delivering torque to the vehicle's wheels has as mentioned above traditionally been focused on torque-based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface between VMM 360 and the MSD controller or controllers 330, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

Referring again to FIG. 2, the example longitudinal tyre forces Fx1, Fx2 show an almost linearly increasing part 210 for small wheel slips, followed by a part 220 with more non-linear behavior for larger wheel slips. It is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ 230 on the order of, e.g., 0.15 or so, can be imposed on a given wheel.

The tyre model Fx1 is representative of a high friction scenario, i.e., dry road with good tyres, while Fx2 is representative of a reduced friction scenario. Note that the maximum achievable tyre force drops with the friction coefficient $\mu$. Note also that the wheel slip value corresponding to the peak wheel force shifts a bit between the two curves, where the peak 240 of the curve Fx1 occurs for a higher wheel slip compared to the peak 245 for the curve Fx2. Hence, a wheel slip limit $\lambda_{lim}$ configured some margin to the left of the peak 245 of the curve Fx2 may be overly conservative if in fact the curve Fx1 is closer to the actual relationship between wheel slip and wheel force.

It is generally advantageous to configure the wheel slip limit 230 in dependence of an inverse tyre model, and not as a predetermined or hardcoded parameter. A wheel slip limit configured relative to, e.g., the peak value of an assumed inverse tyre model will be matched to the current operating conditions of the vehicle. However, it may still be desired to override a slip limit which has been configured based on an assumed inverse tyre model, and to generate a higher wheel slip than what would normally be allowed by the system under a default inverse tyre model. For instance, the default inverse tyre model may inadvertently be too conservative, meaning that the full potential traction or braking force by the vehicle is not available since the slip limit of the default inverse tyre model prevents operation at the desired wheel slips. In fact, it may be desired to temporarily use a more "aggressive" inverse tyre model which allows more wheel slip to be generated compared to the case for a default inverse tyre model used otherwise. Such a more aggressive inverse tyre model may be desired for one or more wheels on the vehicle, or for one or more axles.

For instance, suppose that the heavy-duty vehicle motion management uses an inverse tyre model according to the curve Fx2 as default inverse tyre model, while in reality the curve Fx1 more accurately models the true relationship between wheel slip and longitudinal wheel force. Suppose further that a wheel slip limit has been configured at 230 for the default inverse tyre model Fx2 in order to ensure operation in the linear region 210. With this slip limit, the vehicle will not be able to generate more wheel force than indicated by the dashed line F in FIG. 2, which is way below the maximum achievable wheel force F' at the true peak 240.

To allow a driver or some other form of vehicle controller, such as an autonomous or semi-autonomous drive system, to override a configured default inverse tyre model which potentially does not allow sufficient wheel slip to be generated by some wheel or wheels on the vehicle 100, it is proposed herein to allow for a temporary shift to a boost inverse tyre model which allows more wheel slip to be generated. One or more such boost inverse tyre models can be configured by the system, and then temporarily activated as needed, e.g., in response to some form of boost signal, which boost signal may, e.g., be triggered by a driver depressing an acceleration or brake pedal beyond a certain threshold value, or by a driver operating some in-cabin manual control, like a boost button on the dashboard. For certain vehicles and use cases, that include both autonomous and human-centered driving modes, it may be desirable to be able to give a human driver more control authority than an automated driver, the techniques disclosed herein may be used to provide such an increased level of control over the allowable wheel slip and general vehicle behavior.

The boost signal mechanism may also be used by some remote authority, like a control tower, to allow some vehicles to operate at higher slip values temporarily, e.g., when it is desired that such high wheel slip operation may be advantageous and deemed safe.

Also, if the inverse tyre model is updated in real time, based on observed vehicle behavior, then it can be beneficial that in some situations the wheel slip is allowed to go beyond the peak of the current 'known' tyre model. When the vehicle is being driven by a human driver the accelerator pedal can be used to 'force' a higher slip target in certain situations, and (for example) gain some additional traction performance if the current tyre model parametrization is overly conservative. This way the vehicle controller may "probe" the relationship between wheel force and wheel slip also beyond the assumed peak wheel force slip of the default inverse tyre model, at least temporarily.

For some functional safety argumentation, adding this type of wheel slip limit "override" may reduce the number of functional safety requirements placed on the inverse tyre model, as here the human driver can always override to a higher slip target in critical situations (e.g., stuck on a train track and trying to take off).

Figure 3:
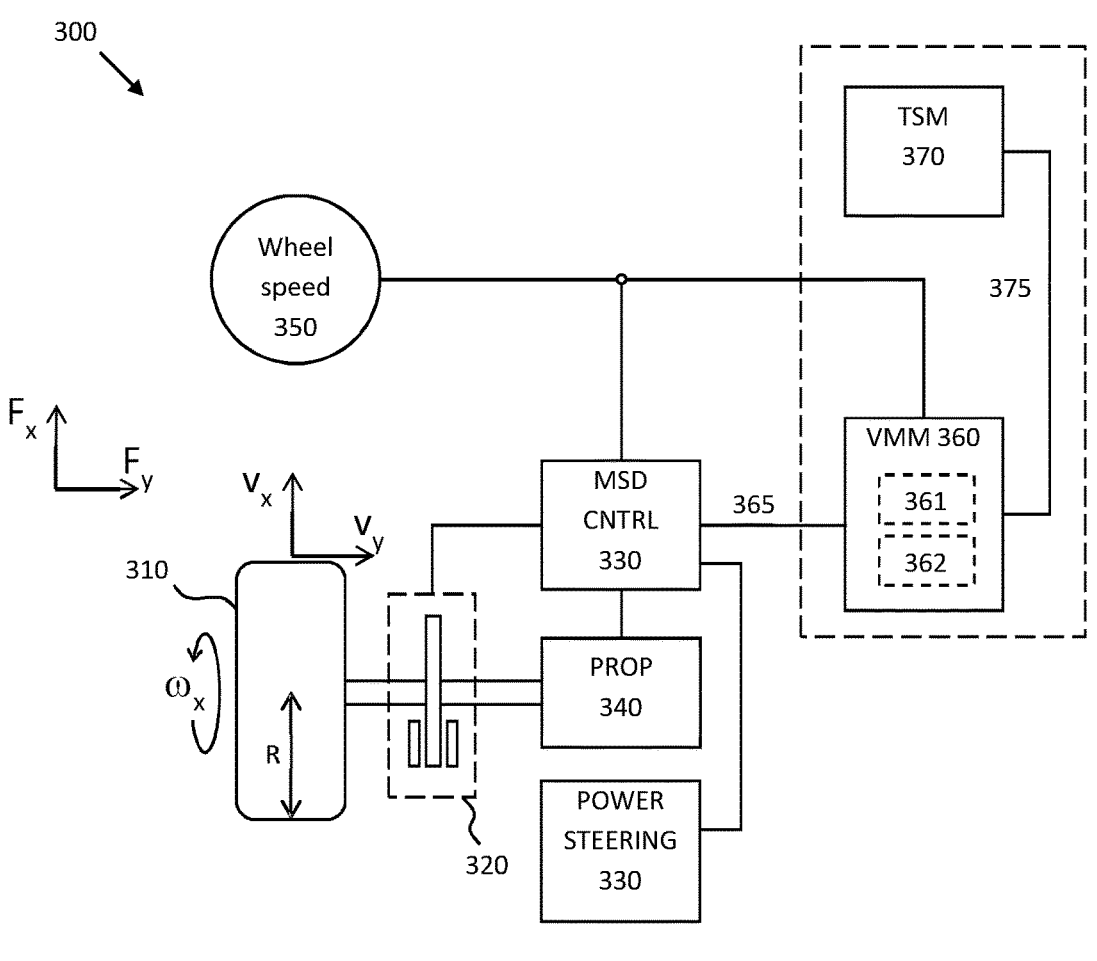
FIG. 3 shows an example motion support device control arrangement.

Turning now to FIG. 3, the overall vehicle control system 300 may be implemented on one or more vehicle unit computers (VUC). The VUC may be configured to execute vehicle control methods which are organized according to a layered functional architecture where some functionality may be comprised in a traffic situation management (TSM) domain 370 in a higher layer and some other functionality may be comprised in a vehicle motion management (VMM) domain 360 residing in a lower functional layer.

FIG. 3 schematically illustrates functionality 300 for controlling an example wheel 310 on the vehicle 100 by some example MSDs here comprising a friction brake 320 (such as a disc brake or a drum brake), a propulsion device 340 and a power steering arrangement 330. The friction brake 320 and the propulsion device are examples of wheel torque generating devices, which can be controlled by one or more motion support device control units 330. The control is based on, e.g., measurement data obtained from a wheel speed sensor 350 and from other vehicle state sensors 370, such as radar sensors, lidar sensors, and also vision based sensors such as camera sensors and infra-red detectors. An MSD control system 330 may be arranged to control one or more actuators. For instance, it is not uncommon that an MSD control system 330 is arranged to control both wheels on an axle.

The TSM function 370 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 360 which performs force allocation to meet the requests from the TSM function in a safe and robust manner. The VMM function 360 operates on a timescale of below one second or so and will be discussed in more detail below.

The wheel 310 has a longitudinal velocity component $v_x$ and a lateral velocity component $v_y$. There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $\omega_x$, and a radius R.

The type of inverse tyre models exemplified by the graph 200 in FIG. 2 can be used by the VMM 360 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 330 will be able to deliver the requested torque with much higher bandwidth by maintaining operation at the desired wheel slip, using the vehicle speed $v_x$ and the wheel rotational velocity $\omega_x$, obtained, e.g., from the wheel speed sensor 350. The vehicle speed $v_x$ can be obtained from various vehicle sensors such as radar, lidar, and vision-based sensor in combination with a global positioning system (GPS) receiver and the like.

The control unit or units can be arranged to store one or more pre-determined inverse tyre models in memory, e.g., as look-up tables or parameterized functions. An inverse tyre model can also be arranged to be stored in the memory as a function of the current operating condition of the wheel 310. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 310. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 310 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Inverse tyre models can be automatically configured from the remote server 120, e.g., as software updates, or manually by a technician performing vehicle routine servicing.

The VMM module 360 in the example of FIG. 3 has at least two different inverse tyre models configured, a default inverse tyre model 361 and a boost inverse tyre model 362, where the boost inverse tyre model 362 is associated with a higher maximum obtainable wheel slip value for one or more wheels of the vehicle compared to the default inverse tyre model. Thus, the boost inverse tyre model allows for a more aggressive vehicle control compared to the default inverse tyre model. The VMM module also comprises an inverse tyre model selection module, this module is adapted to configure the default inverse tyre model 361 as the active inverse tyre model unless a boost signal is detected. When the boost signal is detected, the inverse tyre model selection module instead configures the boost inverse tyre model 362 as the active inverse tyre model. This means that, at least temporarily, the positive propulsion wheel slip is allowed to be larger while the negative braking wheel slip is allowed to be smaller (more negative) compared to when the default inverse tyre model is selected as the active inverse tyre model.

Thus, the VMM system and the MSD controller is at least temporarily allowed to control the wheel at a wheel slip beyond the nominal wheel slip limit of the default inverse tyre model, in order to obtain a more aggressive wheel slip behavior compared to the default behavior of the wheel. For instance, in case the inverse tyre model used by the VMM function is the Fx2 function in FIG. 2, while the Fx1 function is in fact closer to the true relationship, then the boost mode allows the vehicle to approach the peak force 240, at least during a limited period of time. Consequently, a driver wanting to negotiate an up-hill road with difficult road friction conditions, would be allowed to temporarily increase wheel slip beyond the wheel slip limit of the default inverse tyre model in order to see if this provides more longitudinal wheel force or not. The function is similar in nature to the type of "step-down" or "kick-down" acceleration boost mode that exist in many personal cars today.

Figure 4:
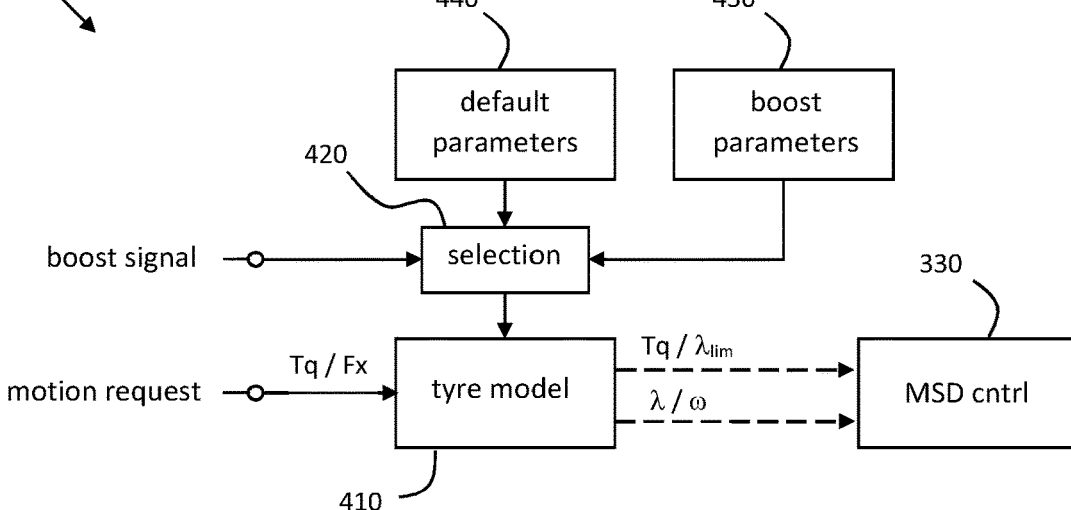
FIG. 4 illustrates an example arrangement for wheel slip boosting.

FIG. 4 shows an example of the tyre model selection function 400. There is one input port for the motion request and one input port for the boost signal. The tyre model module 410 converts the motion request signal into a torque request with a wheel slip limit and/or into a wheel slip or wheel speed request which is sent to the MSD controller 330. A selection module 420 receives the boost signal, which may, e.g., be a signal indicating that the accelerator pedal or the brake pedal has been depressed beyond some threshold value. The selection module 420 configures the active inverse tyre model to be used in controlling the vehicle based on the status of the boost signal. It selects the boost inverse tyre model 430 as active inverse tyre model in response to detecting the boost signal and selects the default inverse tyre model 440 as active inverse tyre model otherwise. In this example the selection module selects parameters for parameterizing the active inverse tyre model. Some examples of such parameters which can be used to define the inverse tyre model will be discussed below in connection to FIGS. 6-8. However, it is appreciated that an inverse tyre model parameter may comprise the entire tyre model also, not just a set of tyre model parameters.

Figure 5:
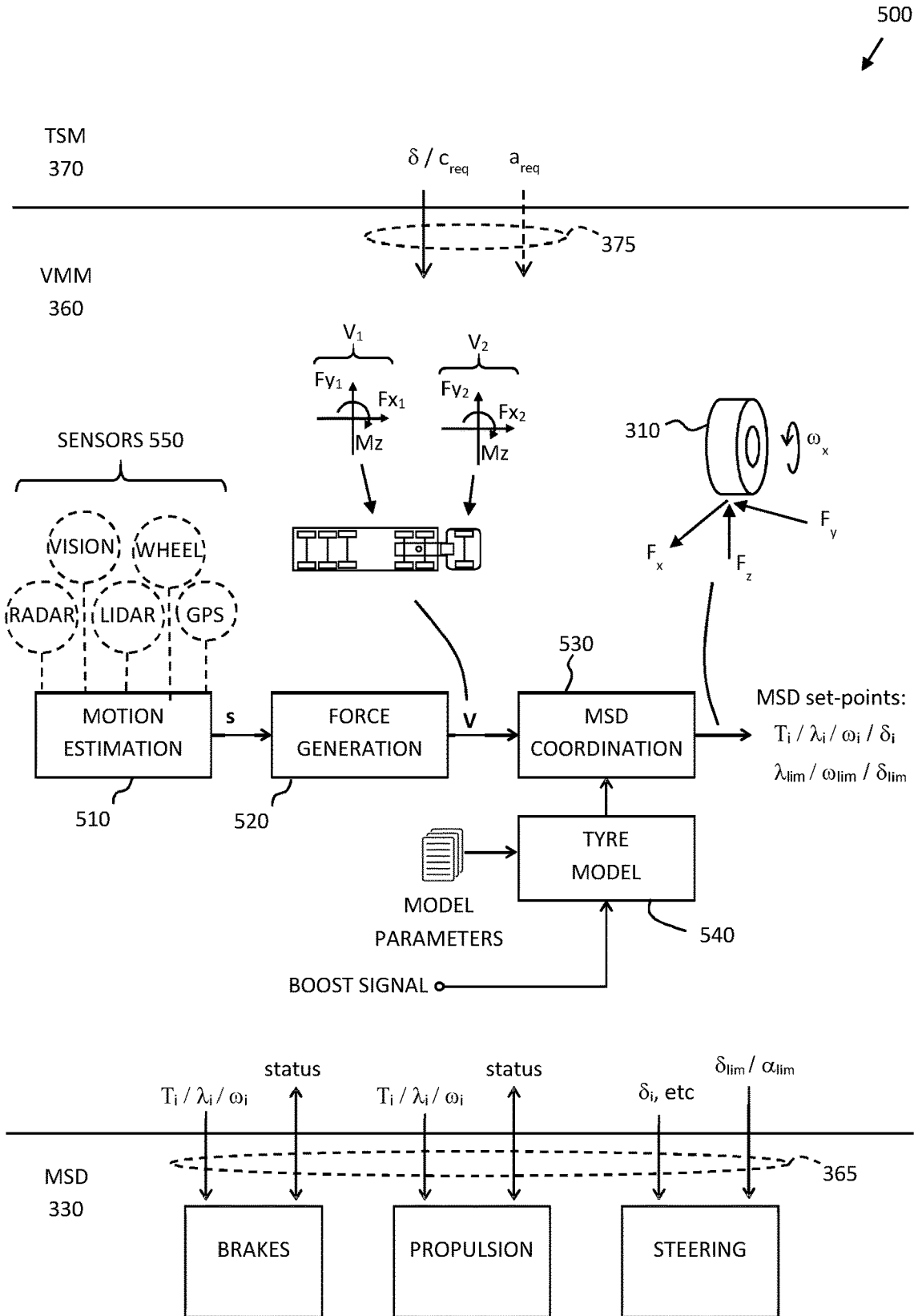
FIG. 5 illustrates an example vehicle control function architecture.

FIG. 5 illustrates an example vehicle control function architecture applicable with the herein disclosed methods, where the TSM function 370 generates vehicle motion requests 375, which may comprise a desired steering angle δ or an equivalent curvature $c_{req}$ to be followed by the vehicle, and which may also comprise desired vehicle unit accelerations areq and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver.

The VMM function 360 operates with a time horizon of about 1 second or so, and continuously transforms the acceleration profiles $a_{req}$ and curvature profiles $c_{req}$ from the TSM function into control commands for controlling vehicle motion functions, actuated by the different MSDs of the vehicle 100 which report back capabilities to the VMM, which in turn are used as constraints in the vehicle control. The VMM function 360 performs vehicle state or motion estimation 510, i.e., the VMM function 360 continuously determines a vehicle state s comprising positions, speeds, accelerations, and articulation angles of the different units in the vehicle combination by monitoring operations using various sensors arranged on the vehicle 100, often but not always in connection to the MSDs.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\lambda_i$. The coordinated MSDs then together provide the desired lateral $F_y$ and longitudinal $F_x$ forces on the vehicle units, as well as the required moments Mz, to obtain the desired motion by the vehicle combination 100.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 310 (in terms of, e.g., longitudinal and lateral velocity components), it becomes possible to accurately estimate wheel slip in real time by comparing the vehicle unit motion in the wheel reference coordinate system to data obtained from the wheel speed sensor 350 arranged in connection to the wheel 310, as discussed above.

Thus, according to some aspects of the present disclosure, the VMM function 360 manages both force generation and MSD coordination, i.e., it determines what forces that are required at the vehicle units in order to fulfil the requests from the TSM function 370, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 370.

A tyre model 540, which was discussed above in connection to FIG. 2, can be used to translate between a desired longitudinal tyre force $Fx_i$ for a given wheel i and an equivalent longitudinal wheel slip $\lambda_i$ for the wheel. This tyre model is adapted based on the boost signal as discussed above, i.e., the active inverse tyre model is selected in dependence of the boost signal as a default inverse tyre model or a boost inverse tyre model which allows more wheel slip to be generated for a given wheel.

Figure 9:
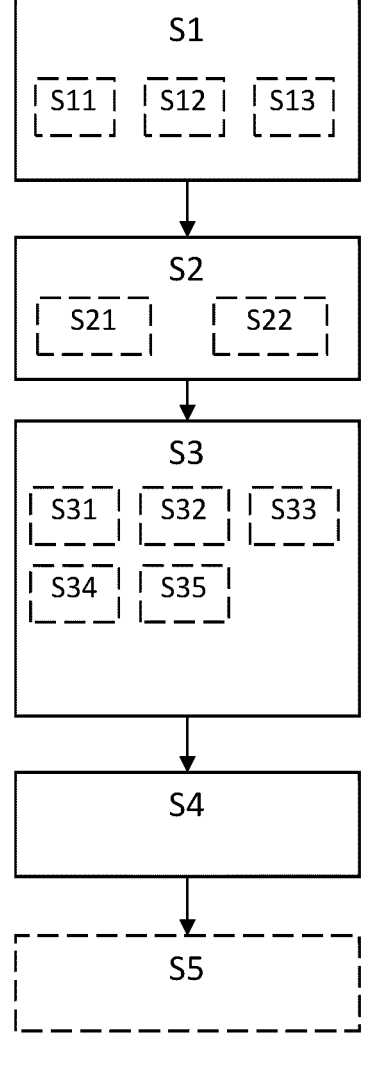
FIG. 9 is a flow chart illustrating methods.

To summarize, with reference to the flow chart in FIG. 9, there is disclosed herein a computer implemented method for controlling at least one driven and/or braked wheel 102, 310 of a heavy-duty vehicle 100. The method comprises configuring S1 a default inverse tyre model and a boost inverse tyre model, where each inverse tyre model represents a respective relationship between longitudinal wheel slip $\lambda$ and longitudinal wheel force Fx at the wheel 102, 310, where the boost inverse tyre model is associated with a higher maximum obtainable wheel slip value $\lambda_{lim}$ for the wheel 102, 310 compared to the default inverse tyre model. It is appreciated that more than one boost inverse tyre model can be configured, where the boost inverse tyre model to use can be selected in dependence of a vehicle operating condition, such as an estimated road incline or friction coefficient.

Figure 6:
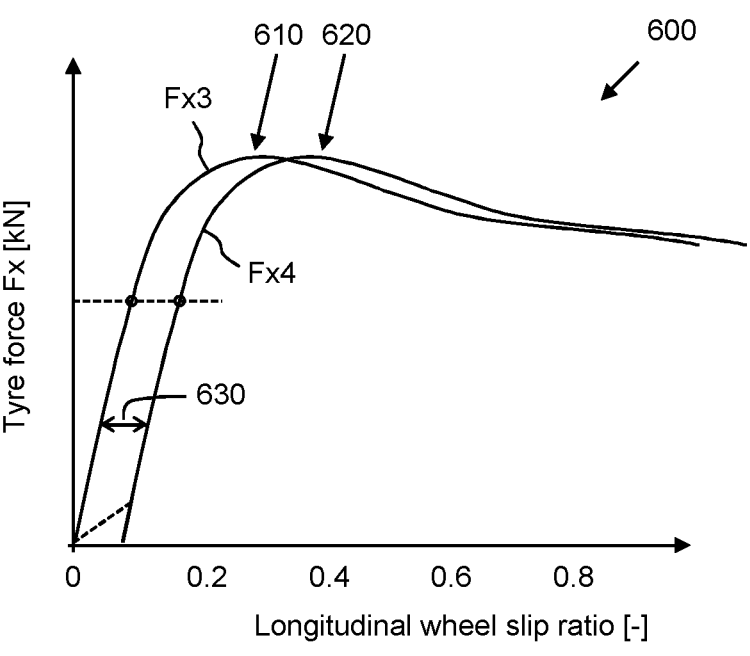
FIGS. 6-8 show some example default and boost inverse tyre models.

According to some aspects, the method comprises configuring S11 the boost inverse tyre model with a peak longitudinal wheel force 240 that corresponds to higher wheel slip value compared to the default inverse tyre model peak longitudinal wheel force. This means that the location of the peak wheel force is shifted to higher wheel slip values compared to the case for the default inverse tyre model. This also means that a system using the location of the peak force to configure, e.g., a wheel slip limit will allow a higher wheel slip to be controlled against when using the boost model compared to when using the default model, as intended. FIG. 6 illustrates an example of this type of reconfiguration, where the default inverse tyre model is shown as the curve Fx3 with peak force location 610 and the boost inverse tyre model is shown as the curve Fx4 with peak force location 620. The curve Fx4 is simply a shifted version of the curve Fx3, which means that the peak location is shifted towards higher wheel slip values compared to the peak of the default inverse tyre model. The offset in wheel slip 630 can be configured at, say a wheel slip of 0, 1 or the like. More than one offset value can also be used, for more than one boost inverse tyre model. The offset can also be gradually increased in response to detection of the boost signal, and then be gradually reduced back to zero after some time period. An optional adjustment can be added to the offset curve to make a zero generated tyre force correspond to a zero slip value, as shown by the dotted line 640 in FIG. 6.

According to other aspects, the method comprises configuring S12 the boost inverse tyre model with a smaller slip stiffness value compared to the default inverse tyre model. FIG. 7 illustrates an example 700 of two inverse tyre models. In this case the inverse tyre models are approximated as linear models with a rise given by the slip stiffness Cx1 and Cx2, where in this case the boost inverse tyre model has a smaller slip stiffness value Cx2 compared to the default inverse tyre model Cx1. Each inverse tyre model is associated with a respective wheel slip limit value 710, 720 at the assumed peak force location 730, 740. Note that the boost inverse tyre model which has the slip stiffness Cx2 is associated with a higher maximum obtainable wheel slip value compared to the default inverse tyre model. FIG. 8 illustrates an example of a default inverse tyre model 810 and a boost inverse tyre model 820 where the peak force location p2 of the boost inverse tyre model is higher compared to the default inverse tyre model peak location p1. This also means that the boost inverse tyre model allows for higher wheel slips to be controlled compared to the default inverse tyre model which will not permit a wheel slip larger than the wheel slip limit at the assumed peak location.

According to other aspects, the method comprises configuring S13 the boost inverse tyre model with a higher wheel slip limit 230 compared to the default inverse tyre model. Thus, it is appreciated that the same fundamental inverse tyre model can be used both for the default model and the boost model, with a change in wheel slip limit to distinguish the two. The wheel slip limit can, for instance, be defined as the wheel slip 10% from the peak for the default inverse tyre model and at the peak for the boost inverse tyre model, or even 10% past the peak for the boost inverse tyre model.

With continued reference to FIG. 9, the method comprises obtaining S2 a motion request $a_{req}$ indicative of a desired longitudinal force $F_x$ to be generated by the wheel 102, 310. The motion request may, as discussed above, be determined as a function of an accelerator pedal position or a brake pedal position of the heavy-duty vehicle 100. The motion request $a_{req}$ can also be obtained from an MSD coordination function 530 of a VMM system comprised in the heavy-duty vehicle 100 or from an autonomous or semi-autonomous drive function comprised in the vehicle 100.

The method furthermore comprises selecting S3 the boost inverse tyre model as the active inverse tyre model in response to detecting a boost signal 550 and selecting the default inverse tyre model as active inverse tyre model otherwise, and controlling S4 the at least one driven and/or braked wheel 102, 310 in dependence of the motion request $a_{req}$ and based on the active inverse tyre model.

The generation of the boost signal may be based on one or more triggers, and potentially also conditioned on one or more parameters. A trigger is some form of event which causes generation of the boost signal, but only if all the configured conditions are met. For instance, the boost signal S31 generation optionally comprises an accelerator pedal position exceeding a threshold value. Thus, if a driver presses the pedal down enough, such as beyond 80% of the full pedal range, the boost signal is generated if all the configured conditions are also met. The boost signal may also be configured to be generated by a mechanical or electrical switch when the accelerator or brake pedal is depressed fully. According to further aspects, the boost signal is triggered by an accelerator pedal position or brake pedal position exceeding the threshold value for a predetermined time period. In this case the driver needs to depress the pedal for a certain amount of time before the boost functions discussed herein are triggered.

As mentioned above, the boost signal can comprise more than one level, where each level of the boost signal causes selection of a corresponding boost inverse tyre model from a plurality of boost inverse tyre models. For example, if the driver presses the gas pedal more than 70% but less than 90% a first boost inverse tyre model is selected as active inverse tyre model, and if the driver then presses the same pedal more than 90% then a second boost inverse tyre model is selected as active inverse tyre model to be used in controlling the heavy-duty vehicle.

The boost signal S32 may also be configured to be triggered by operation of a manual trigger device. This manual trigger device may, e.g., be an in-cabin button or a menu selection option on a control system of the vehicle. Thus, a driver desiring to obtain additional wheel slip beyond the configured nominal wheel slip limit may activate the manual trigger device in order to shift the wheel slip limit to a higher magnitude value. This manual trigger device may of course also have more than one level, where each level corresponds to a boost inverse tyre model.

The boost signal may of course also be arranged to be remotely triggered by operation of a remote-control trigger device. For instance, a remote-control tower or the like may comprise a remote-control system which implements a function to remotely activate the boost function and increase the magnitude of the configured wheel slip limit value from the nominal wheel slip limit value to a boost wheel slip limit value. The remote-control trigger device then implements a function which permits a given vehicle to operate at a higher wheel slip limit compared to a nominal configuration, which may be desired in some scenarios. For instance, operating at a higher wheel slip may be deemed safe if no other vehicles are nearby, and it is determined that an extra increase in wheel slip would be beneficial from a vehicle motion management performance perspective.

The boost signal S33 may be conditioned on that the vehicle 100 is operating at a velocity below a vehicle velocity acceptance threshold. This means that no increase in wheel slip limit magnitude will be allowed to occur if the vehicle is moving too fast, which could otherwise increase the risk of the vehicle ending up in an unstable or otherwise undesired state. The boost signal generation S34 may furthermore be conditioned on that the vehicle 100 is operating at a yaw motion below a vehicle yaw motion acceptance threshold. Thus, no increase of wheel slip limit will be permitted if the vehicle is turning too much, i.e., following a path of too large curvature. It is appreciated that the condition on yaw motion may be disregarded if the vehicle is moving very slowly. Hence, in case the vehicle 100 is operating at a velocity below a vehicle velocity acceptance threshold, more yaw motion may be permitted compared to if the vehicle is moving faster.

The method may furthermore comprise determining S35 a lateral force requirement of the at least driven and/or braked wheel 102. Generation of the boost signal may then be conditioned on that the lateral force requirement is below a lateral force requirement threshold. The rationale for this being that only very little lateral force is possible to generate if the wheel is operating at too large longitudinal wheel slip. Hence, if there are lateral forces to be generated, it may be unwise to allow an increase of wheel slip to levels where such lateral forces cannot be generated. It is, however, appreciated that the condition on low velocity may take precedence over the condition on lateral force requirement.

According to further aspects, the method also comprises updating S5 the default inverse tyre model associated with the at least one driven and/or braked wheel 102 in response to detecting the boost signal. These aspects become relevant when the inverse tyre model is adjusted continuously or periodically based, e.g., on an estimated longitudinal wheel force. In this case the VMM system may keep a record of wheel slips and corresponding estimated or measured wheel force values. For instance, some electric machines provide an output signal indicative of an applied torque in real time, which can be translated into wheel force. However, the inverse tyre model will be inaccurate for large slip values above the configured wheel slip limit, since such values never occur, unless the boost mode is used to allow them temporarily.

Figure 10:
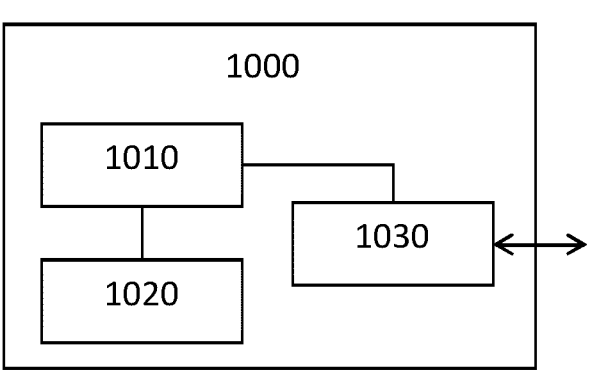
FIG. 10 schematically illustrates a control unit.

FIG. 10 schematically illustrates, in terms of a number of functional units, the components of a control unit 1000 according to embodiments of the discussions herein, such as any of the MSD control system 330 or the VMM system 360. Processing circuitry 1010 is provided using any combination of one or more of a suitable central processing unit CPU, multiprocessor, microcontroller, digital signal processor DSP, etc., capable of executing software instructions stored in a computer program product, e.g., in the form of a storage medium 1030. The processing circuitry 1010 may further be provided as at least one application specific integrated circuit ASIC, or field programmable gate array FPGA. Particularly, the processing circuitry 1010 is configured to cause the control unit 1000 to perform a set of operations, or steps, such as the methods discussed in connection to FIG. 9 and generally herein. For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed. The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 10 illustrates an example of a control unit 1000 for controlling at least one driven and/or braked wheel 102, 310 of a heavy-duty vehicle 100. The control unit comprises processing circuitry 1010 arranged to configure a default inverse tyre model and a boost inverse tyre model, where each inverse tyre model represents a respective relationship between longitudinal wheel slip $\lambda$ and longitudinal wheel force $F_x$ at the wheel 102, 310, where the boost inverse tyre model is associated with a higher maximum obtainable wheel slip value $\lambda_{lim}$ for the wheel 102, 310 compared to the default inverse tyre model. The processing circuitry is also arranged to obtain a motion request $a_{req}$ indicative of a desired longitudinal force $F_x$ to be generated by the wheel 102, 310, select the boost inverse tyre model as active inverse tyre model in response to detecting a boost signal and selecting the default inverse tyre model as active inverse tyre model otherwise, and control the at least one driven and/or braked wheel 102, 310 in dependence of the motion request $a_{req}$ and based on the active inverse tyre model.

Figure 11:
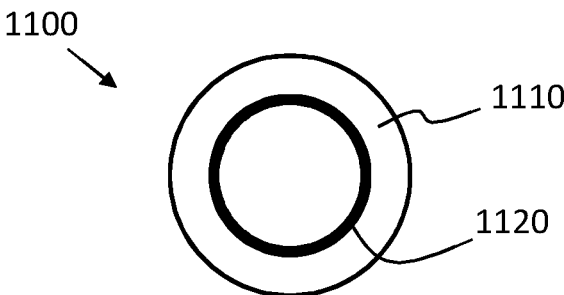
FIG. 11 shows an example computer program product.

FIG. 11 illustrates a computer readable medium 1110 carrying a computer program comprising program code means 1120 for performing the methods illustrated in FIG. 9 and the techniques discussed herein, when said program product is run on a computer. The computer readable medium and the code means may together form a computer program product 1100.

The invention claimed is:

1. A computer implemented method for controlling at least one driven and/or braked wheel of a heavy-duty vehicle, the method comprising configuring a default inverse tire model and a boost inverse tire model, where each inverse tire model represents a respective relationship between longitudinal wheel slip and longitudinal wheel force at the wheel, where the boost inverse tire model is associated with a higher maximum obtainable wheel slip value for the wheel compared to the default inverse tire model, obtaining a motion request indicative of a desired longitudinal force to be generated by the wheel, selecting the boost inverse tire model as active inverse tire model in response to detecting a boost signal and selecting the default inverse tire model as active inverse tire model otherwise, wherein the boost signal is arranged to be manually triggered by operation of a trigger device, and controlling the at least one driven and/or braked wheel in dependence of the motion request and based on the active inverse tire model.

2. The method according to claim 1, comprising configuring the boost inverse tire model with a peak longitudinal wheel force that corresponds to a higher wheel slip value compared to the default inverse tire model peak longitudinal wheel force.

3. The method according to claim 1, comprising configuring the boost inverse tire model with a smaller slip stiffness value compared to the default inverse tire model.

4. The method according to claim 1, comprising configuring the boost inverse tire model with a higher wheel slip limit compared to the default inverse tire model.

5. The method according to claim 1, comprising obtaining the motion request as function of an accelerator pedal position or a brake pedal position of the heavy-duty vehicle.

6. The method according to claim 1, comprising obtaining the motion request from a motion support device coordination function of a vehicle motion management system comprised in the heavy-duty vehicle or from an autonomous or semi-autonomous drive function comprised in the vehicle.

7. The method according to claim 1, wherein the trigger device comprises an accelerator pedal and/or a brake pedal, and wherein the boost signal is triggered by an accelerator pedal position or brake pedal position exceeding a predetermined threshold value.

8. The method according to claim 1, wherein the boost signal is conditioned on that the vehicle is operating at a velocity below a vehicle velocity acceptance threshold.

9. The method according to claim 1, wherein the boost signal is conditioned on that the vehicle is operating at a yaw motion below a vehicle yaw motion acceptance threshold.

10. The method according to claim 1, comprising determining a lateral force requirement of the at least driven and/or braked wheel, wherein the boost signal is conditioned on that the lateral force requirement is below a lateral force requirement threshold.

11. The method according to claim 1, comprising updating the default inverse tire model in response to detecting the boost signal.

12. A non-transitory computer readable medium storing a computer program comprising program code for performing the steps of claim 1 when the program is run on a computer.

13. A control unit for controlling at least one driven and/or braked wheel of a heavy-duty vehicle, the control unit comprising processing circuitry arranged to configure a default inverse tire model and a boost inverse tire model, where each inverse tire model represents a respective relationship between longitudinal wheel slip and longitudinal wheel force at the wheel, where the boost inverse tire model is associated with a higher maximum obtainable wheel slip value for the wheel compared to the default inverse tire model, obtain a motion request indicative of a desired longitudinal force to be generated by the wheel, select the boost inverse tire model as active inverse tire model in response to detecting a boost signal and selecting the default inverse tire model as active inverse tire model otherwise, wherein the boost signal is arranged to be manually triggered by operation of a trigger device, and control the at least one driven and/or braked wheel in dependence of the motion request and based on the active inverse tire model.

14. A heavy-duty vehicle comprising a control unit according to claim 13.

* * * * *